May 24, 1960  E. GRESSEL  2,937,891
REDUCING COUPLING
Filed Nov. 4, 1957
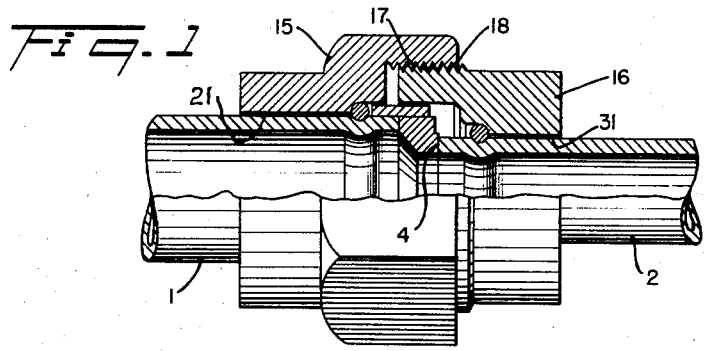
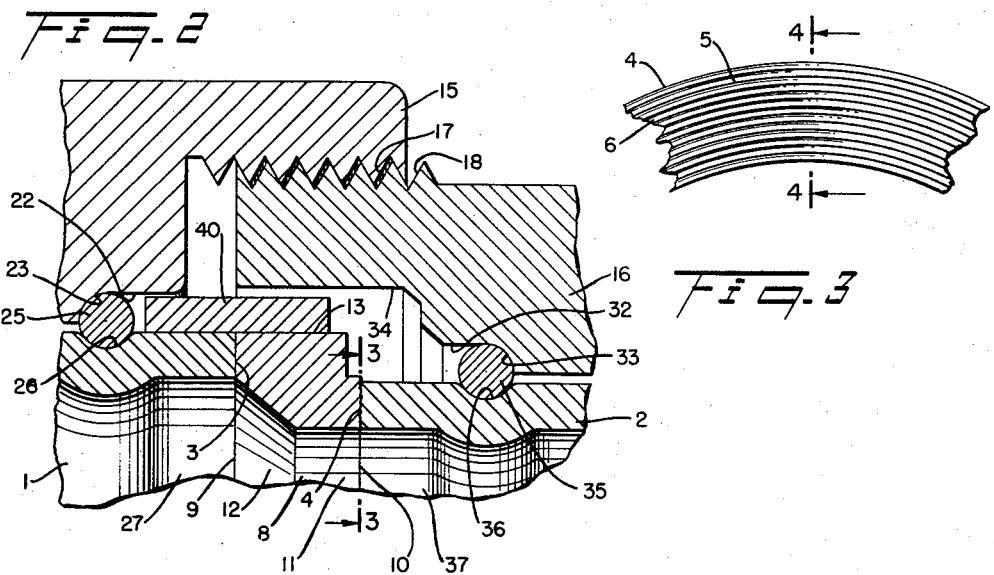
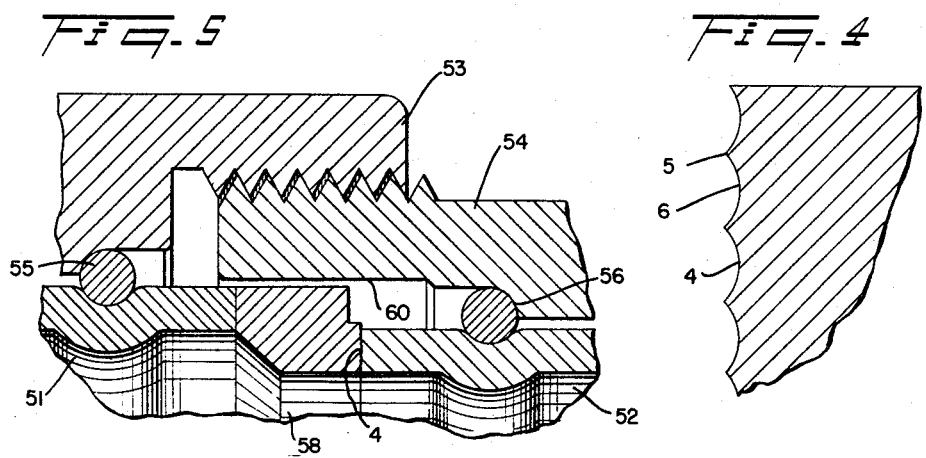

United States Patent Office 2,937,891
Patented May 24, 1960

2,937,891

REDUCING COUPLING

Edmond Gressel, Schulstrasse 54, Aadorf, Switzerland

Filed Nov. 4, 1957, Ser. No. 694,353

3 Claims. (Cl. 285—177)

The present invention relates to joining successive sections of pipe of different diameter. The term "section" is used in a generic sense to include either a length of pipe or a fitting such as an elbow, T or cross. This application is a continuation-in-part of my corresponding application, Serial No. 667,942, filed June 25, 1957.

It is an object of the present invention to provide an improved joint between pipe sections of different diameter having the following characteristics:

(1) Fluid tightness is obtained without the use of rubber or other gasket material.

(2) The inner surface of the pipe at the joint is smoothly tapered without projections or recesses where deposits of material can collect.

(3) The pipe joint is not affected by high operating temperatures or by changes in temperature.

(4) It is capable of withstanding high pressures, for example pressures of the order of 500 pounds per square inch.

(5) The pipe joint is of simple construction and is reliable and durable.

(6) It can be connected and disconnected easily and repeatedly.

Because of these characteristics, reducing pipe joints in accordance with the invention are especially suitable for sanitary pipe lines used for food and drug products. They are also suitable for pipe lines handling chemicals including those of a corrosive nature and for pipe lines required to operate at high temperatures. The invention is especially applicable to joining sections of thin walled pipe. The term "thin walled" is herein used to designate pipe having a wall thickness that is materially less than that of standard pipe. For example the wall thickness of standard 2" pipe is 0.54 inch. Thin wall pipe has a lesser wall thickness for example 0.065 inch. While the invention is not limited to particular pipe sizes, its greatest value at present is for joining pipes having a nominal diameter of ½ inch to 3 inches.

The objects, characteristics and advantages of the invention will be more fully understood from the following description and claims in conjunction with the accompanying drawings which illustrate preferred embodiments of the invention and in which:

Fig. 1 is a side view of a pipe joint in accordance with the invention with portions broken away to show a portion of the pipe joint in longitudinal section.

Fig. 2 is an enlargement of a portion of Fig. 1.

Fig. 3 is a fragmentary end view of one of the pipe sections as viewed approximately from the line 3—3 in Fig. 2.

Fig. 4 is a fragmentary and greatly enlarged section taken approximately on the line 4—4 in Fig. 3.

Fig. 5 is a sectional view similar to Fig. 2 but showing a different construction.

A pipe joint in accordance with the invention is shown by way of example in Figs. 1 to 4 joining two pipe sections 1 and 2 of different diameters. While the pipe sections are illustrated as being the end portions of pipe lengths, either or both may be fittings such as elbows, T's or crosses. The pipe sections are formed of material which is hard and strong yet sufficiently malleable and resilient as to be deformable without fracturing. For many uses in the food, drug and chemical industries, it is also desirable for the pipe sections to be corrosion resistant. As an example of a suitable material, the pipe sections may be formed of stainless steel containing approximately 18% nickel and 8% chromium. The wall of the pipe is preferably materially thinner than the wall of standard pipe of like diameter.

The larger pipe section 1 has an end face 3 which lies substantially in a plane perpendicular to the axis of the pipe section. The smaller pipe section 2 has a similar end face 4. Each of the end faces 3 and 4 is accurately finished to obtain a true surface. The finishing is preferably effected by a special instrument which fits onto the end of the pipe and has a cutting tool that rotates about the pipe axis and is fed progressively by movement in a radial direction. The feeding of the tool is effected continuously or step-by-step at a selected rate to produce a surface that is smooth and true in appearance but when examined with magnification, is seen to have minute ridges 5 separated by valleys 6. The ridges and valleys are spiral when produced by a tool that is fed continuously and are substantially circular with periodic offsets when the tool is fed stepwise. In either event, they are substantially concentric with the axis of the pipe section and hence perpendicular to its radius at any point of its circumference. The ridges and valleys are of such minute size and are so closely spaced that the surface appears smooth and polished with a finish of the order of 16 to 32 microinches. The tool preferably has a rounded cutting end so that the valleys are of arcuate cross section and the sides of the ridges are hence concave as illustrated in Fig. 4.

The end surfaces of the pipe sections 1 and 2 directly abut the opposite end faces of a reducing element 8 which is interposed between the two pipe ends. The reducing element 8 may be formed of material having characteristics similar to those of the pipe section. It is of annular configuration with one end surface 9 directly abutting and of substantially the same diameter as the end surface 3 of the larger pipe section 1 and a smaller end face 10 which directly abuts and is of substantially the same diameter as the end face 4 of the smaller pipe section 2. The inner surface of the reducing element 8 comprises a substantially cylindrical portion 11 of the same inside diameter as the smaller pipe section 2 and a tapered or conical portion 12 which tapers from the inner diameter of the larger pipe section 1 to the inner diameter of the smaller pipe section 2 and thereby provides a smooth transition between the two pipe sections. The outer surface 13 of the reducing element 8 is substantially cylindrical and of the same diameter as the outside diameter of the larger pipe section 1. The end faces 9 and 10 of the reducing element are substantially perpendicular to the axis of the pipe sections and are smoothly finished for example like the end faces 3 and 4 of the pipe section. In the embodiment shown in the drawing the length of the reducing element is approximately equal to its thickness in a radial direction.

The end faces of the pipe sections 1 and 2 are pressed tightly against the opposite end faces of the reducing element 8 by means of annular coupling members 15 and 16 secured respectively to the two pipe sections. One of the coupling members 15 is provided with an internally threaded portion 17 while the other coupling member 16 has an externally threaded portion 18 which screws into the internally threaded portion with a loose fit to draw the two coupling members toward one another. The threads are V-shaped in cross section. By reason of the V-shaped cross section of the threads and the looseness of the fit of the threaded portions the two coupling members are capable of limited angular movement relative to one another to compensate for any imperfections in the trueness of the end faces of the pipe and of the reducing element 8. To assure satisfactory pipe joints under field conditions, the fit between the male and female threads of the coupling members should be sufficiently "sloppy" to provide an axial play of not less than approximately .01 inch.

The coupling members 15 and 16 are secured to the end portions of the pipe sections so as to transmit force in an axial direction from the coupling members to the pipe sections while permitting relative rotation between at least one of the coupling members and the corresponding pipe section. As shown in Figs. 1 and 2 the coupling member 15 has an elongated bore 21 of a size to receive the pipe section 1 with a snug fit which permits free rotation of the coupling member on the pipe. As pipe of the same nominal size frequently varies in actual outside diameter, the axial bore of the coupling member is large enough to accommodate the largest pipe for which the coupling is intended. The length of the bore is sufficient to assure proper alignment of the pipe sections and is preferably approximately equal to the diameter of the pipe section. At its inner end the bore 21 is enlarged to provide an annular recess 22 terminating in a shoulder 23 which is shown as being of approximately quarter circular cross section. A split ring 25 of hard material such as spring steel seats in the recess 22 against the shoulder 23. The ring 25 is shown as being of circular cross section with a radius approximately equal to the depth of the recess 22 in a radial direction. The split ring 25 also seats in an annular groove 26 formed in the outer surface of the pipe section 1. The groove is shown as being of arcuate cross section with a radius approximately equal to that of the ring 25. The depth of the groove 26 is such that the radial distance from the axis of the pipe section 1 to the bottom of the groove 26 is equal to, or slightly less than, the inside radius of the recess 22 minus the diameter of the ring 25. This distance should be accurately maintained despite variation in the outside diameter of the pipe section 1. Hence with maximum size pipe the depth of the groove 26 as measured from the outer surface of the pipe section will be greater than with minimum size pipe. The maximum depth of the groove 26 is slightly less than the cross sectional radius of the ring 25. The minimum depth should not be less than approximately 0.02 inch. The groove 26 is uniformally spaced from the end face 3. The distance between the end face and the groove is preferably less than the diameter of the pipe section but sufficient to provide a cylindrical portion 27 of substantial length between the groove and the end face.

The coupling member 16 is similarly provided with an axial bore 31 of a size to receive the smaller pipe section 2 and annular recess 32 and a shoulder 33. The inner end portion of the coupling member 16 is further enlarged to provide an annular recess 34 having an internal diameter approximately equal to that of the recess 22 of coupling member 15. A split ring 35 seats in the recess 32 against the shoulder 33 and also seats in a peripheral groove 36 provided in the exterior surface of the pipe section 2. The groove 36 of pipe section 2 is similar to groove 26 of pipe section 1 and is similarly spaced from the end face of the pipe section to provide a substantially cylindrical portion 37 between the end face and the groove.

In the embodiment of Figs. 1 and 2 axial alignment of the reducing element 8 with the pipe sections is assured by a centering sleeve or ring 40 which encircles and closely embraces the reducing element 8 and the cylindrical end portion 27 of the pipe section 1. The centering ring 40 is received in the recess 22 of the coupling member 15 and in the recess 34 of the coupling member 16. It is of sufficient length to assure engagement with the pipe section 1 and the reducing element 8 to hold the reducing element in axial alignment with the pipe section. Alignment of the smaller pipe section 2 with the opposite end face 10 of the reducing element is assured by the cooperation of the coupling members 15 and 16 and the split ring 35 which by engaging the inner wall of the recess 32 and the groove 36 in the pipe assures that the pipe section 2 is centered with respect to the coupling member 16.

The grooves 26 and 36 in the pipe sections are preferably formed by a cold rolling process performed with a special pipe tool having a guiding face that abuts the end of the pipe section and disc rollers which form the groove upon rotation of the tool relative to the pipe section. The wall thickness of the pipe section is not reduced materially by formation of the groove. The crystalline lines of the metal are deformed rather than cut by the rolling of the grooves so that the wall is not weakened. Moreover, the rolling operation by which the groove is formed compacts and cold-works the material of the pipe section so as to provide a dense, hard surface.

The method of making a pipe joint in accordance with the present invention comprises the following step. The ends of the pipe sections are subjected to a finishing operation, for example by means of a special tool as described above, in order to provide square end faces at approximately right angles to the axis of the pipe. The grooves 26 and 36 are then rolled in the pipe sections using the square end faces of the pipe as a reference so that the grooves are located a uniform distance from the end faces and the central plane of each groove, i.e. a plane passing through the locus of the cross sectional centers of the groove, is perpendicular to the axis of the pipe. The coupling members 15 and 16 are slipped onto the pipe beyond the grooves 26 and 36 and the split rings 25 and 35 are snapped into place in the groove. The ends of the pipe sections are then refinished to remove any distortion or marring incidental to the grooving and putting the rings in place and to assure true and square end faces having the surface characteristics described above. The centering ring 40 is positioned on the cylindrical end portion 27 of the larger pipe section 1 and the reducing element 8 is slipped into the ring against the end face 3. The end of the smaller pipe section 2 is then brought into engagement with the reducing element and the coupling members 15 and 16 screwed together so as to exert opposite axial forces on the two pipe sections to press their end faces into fluid tight engagement with the opposite end faces of the reducing element 8.

In Fig. 5 there is shown a modification in which two pipe sections 51 and 52 are joined by coupling members 53 and 54 secured to the pipe sections by split rings 55 and 56. A reducing element 58 is interposed between the ends of the two pipe sections. The reducing element 58 is held in axial alignment with the pipe sections by engagement with the peripheral wall of an annular recess 60 formed in one of the coupling members 54. The internal diameter of the recess 60 is slightly greater than the outside diameter of the reducing element 58 and the end portion of the larger pipe section 51. When the two coupling members are screwed together, the end of the larger pipe section 51 is preferably received inside the recess 60 of the coupling member 54 so as to be encircled by an end portion of the coupling member to assure accurate alignment of the pipe section 51 and the reducing element 58. It will thus be seen that with the construction shown in Fig. 5 it is not necessary to use a separate centering ring like the ring 40 of Figs. 1 and 2. Except as otherwise shown and described the pipe joint of Fig. 5 is like that of Figs. 1 and 2 and is installed in like manner. Since there is no separate centering ring, the reducing element 58 is held in position during assembly of the coupling by being slipped into the coupling member 54 after the coupling member has been assembled on the pipe and the split ring 56 has been snapped into place.

While preferred embodiments of the invention have been shown by way of example in the drawings and particularly described, it will be understood that the invention is in no way limited to these embodiments and that pipe joints in accordance with the invention may vary as to form and design within the scope of the appended claims.

What I claim and desire to secure by Letters Patent is:

1. A sanitary reducing pipe joint for a pipe line for foods, drugs, chemicals and the like, comprising two pipe sections of different diameter disposed in axial alignment with one another, each of said pipe sections having a square end face, a circumferential external groove spaced from said end face and a smooth cylindrical inner surface adjacent said end face, an annular reducing element disposed between said end faces of said pipe sections, said reducing element having a square end face of larger diameter engaging the square end face of the larger pipe section and an opposite square end face of smaller diameter engaging the square end face of the smaller pipe section and having a gradually tapered inner surface which at one end has a diameter equal to the inner diameter of the smaller pipe section and at the other end has a diameter equal to the inner diameter of the larger pipe section, two threaded coupling members surrounding adjacent end portions of said pipe sections respectively and said reducing member, one of said members having a male thread and the other of said members having a mating female thread engaging with said male thread to screw said members together, each of said coupling members having an axial bore closely receiving the respective pipe section and an annular recess opening toward the inner end of said member and terminating in a radial shoulder, and a split ring seated in said groove of each of said pipe sections and engaging said shoulder of the respective coupling member to transmit axial force from said member to the pipe section to press said square end faces of said pipe sections tightly against the respective square end faces of said reducing element when the coupling members are screwed together and means closely embracing said reducing element to position and retain it in accurate alignment with said sections so that the inner surface of the reducing element and the adjacent cylindrical inner surfaces of said pipe sections together present a continuous smooth surface substantially free of recesses and crevices where deposits of line material can collect.

2. A sanitary reducing pipe joint according to claim 1, in which the end faces of said pipe sections have surfaces comprising minute spaced ridges separated by intervening valleys, said ridges and valleys being substantially concentric with the longitudinal axis of said pipe sections and being of such size as to provide a surface smoothness of the order of 16 to 32 micro-inches.

3. A pipe joint according to claim 1, in which the interengaging threads of said coupling members are of uniform diameter and of V cross section and fit loosely with one another with an axial play of at least .01 inch.

References Cited in the file of this patent

UNITED STATES PATENTS

| 301,512 | Mixer | July 8, 1884 |
| 831,588 | Wood | Sept. 25, 1906 |
| 1,703,696 | Stratford | Feb. 26, 1929 |
| 2,201,862 | Heisterkamp | May 21, 1940 |
| 2,204,754 | Frame | June 18, 1940 |
| 2,320,107 | Speckert | May 25, 1943 |
| 2,347,469 | Dies | Apr. 25, 1944 |

FOREIGN PATENTS

| 182,022 | Austria | Oct. 15, 1954 |
| 195,347 | Canada | Mar. 30, 1918 |
| 224,021 | Great Britain | Nov. 6, 1924 |
| 285,164 | France | 1899 |
| 786,558 | France | June 8, 1935 |